United States Patent
Harada et al.

(10) Patent No.: US 9,127,582 B2
(45) Date of Patent: Sep. 8, 2015

(54) CONTROL APPARATUS FOR HYBRID VEHICLE

(71) Applicant: DENSO CORPORATION, Kariya, Aichi-pref. (JP)

(72) Inventors: Takeshi Harada, Nagoya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 13/930,076

(22) Filed: Jun. 28, 2013

(65) Prior Publication Data

US 2014/0000245 A1    Jan. 2, 2014

(30) Foreign Application Priority Data

Jul. 2, 2012  (JP) ................. 2012-148138

(51) Int. Cl.
*F01N 3/00* (2006.01)
*F01N 3/10* (2006.01)
*B60L 1/02* (2006.01)
(Continued)

(52) U.S. Cl.
CPC ... *F01N 3/10* (2013.01); *B60L 1/02* (2013.01); *B60L 11/12* (2013.01); *B60L 11/14* (2013.01); *F01N 3/2026* (2013.01); *F01N 9/00* (2013.01); *F01N 2900/104* (2013.01); *F01N 2900/1602* (2013.01); *Y02T 10/26* (2013.01); *Y02T 10/47* (2013.01); *Y02T 10/7005* (2013.01); *Y02T 10/7077* (2013.01)

(58) Field of Classification Search
CPC ........... B60L 1/02; F01N 3/2026; F01N 9/00; F01N 3/10; F01N 2900/104; F01N 2900/1602; Y02T 10/26; Y02T 10/47
See application file for complete search history.

(56) References Cited

U.S. PATENT DOCUMENTS 5,327,991 A * 7/1994 Yoshida .................. 180/65.245
5,345,761 A * 9/1994 King et al. ...................... 60/274
(Continued)

FOREIGN PATENT DOCUMENTS

JP    8-338235    12/1996
JP    2006-037780    2/2006
(Continued)

OTHER PUBLICATIONS

Office Action (2 pages) dated Apr. 10, 2014, issued in corresponding Japanese Application No. 2012-148138 and English translation (2 pages).

*Primary Examiner* — Jesse Bogue
(74) *Attorney, Agent, or Firm* — Nixon & Vanderhye PC

(57) ABSTRACT

A hybrid vehicle control apparatus for a hybrid vehicle capable of EV travel generated by a motor-generator with an internal combustion engine is provided. The control apparatus includes a maximum value calculation unit for calculating a maximum value of a supply of electric power for an electrically-heated catalyst, when the internal combustion engine is in a stopped state, provided to the electrically-heated catalyst based on (i) at least one of a start-up electric power required for starting up the engine or an operation electric power required for operating a supplemental device, (ii) an electric power output limit value of the battery, and (iii) an electric power required for a travel of the hybrid vehicle. The control apparatus also includes a power supply controller for controlling the supply of electric power for the electrically-heated catalyst based on the maximum value of the supply of electric power for the electrically-heated catalyst.

7 Claims, 5 Drawing Sheets

(51) Int. Cl.
　　　*F01N 3/20*　　(2006.01)
　　　*F01N 9/00*　　(2006.01)
　　　*B60L 11/12*　　(2006.01)
　　　*B60L 11/14*　　(2006.01)

(56) References Cited

U.S. PATENT DOCUMENTS

| | | | | |
|---|---|---|---|---|
| 5,785,137 | A * | 7/1998 | Reuyl | 180/65.245 |
| 6,892,541 | B2 * | 5/2005 | Suzuki | 60/706 |
| 7,829,048 | B1 * | 11/2010 | Gonze et al. | 423/213.2 |
| 8,056,320 | B2 * | 11/2011 | Gonze et al. | 60/284 |
| 8,209,970 | B2 * | 7/2012 | Gonze et al. | 60/303 |
| 8,413,423 | B2 * | 4/2013 | Roos et al. | 60/284 |
| 2011/0078999 | A1 * | 4/2011 | Gonze et al. | 60/286 |
| 2012/0167554 | A1 * | 7/2012 | Zhang et al. | 60/274 |
| 2012/0247086 | A1 * | 10/2012 | Gonze et al. | 60/274 |

FOREIGN PATENT DOCUMENTS

| | | |
|---|---|---|
| JP | 2011-105133 | 6/2011 |
| JP | 2011-168124 | 9/2011 |

\* cited by examiner

CONTROL APPARATUS FOR HYBRID VEHICLE

CROSS-REFERENCE TO RELATED APPLICATION

This application is based on and claims the benefit of priority of Japanese Patent Application No. 2012-148138 filed on Jul. 2, 2012, the disclosure of which is incorporated herein by reference.

TECHNICAL FIELD

The present disclosure generally relates to a control apparatus of a hybrid vehicle having an electrically-heated catalyst that may be heated by receiving a supply of electric power from a battery, which may be used for purifying the exhaust gas of an internal combustion engine.

BACKGROUND

In recent years, hybrid vehicles are the focus of public attention due to the growing societal need for fuel efficient vehicles. Hybrid vehicles utilize an internal combustion engine and a motor-generator to provide both fuel-efficient and low-emission transportation.

Generally, an electrically-heated catalyst (designated as an "EHC" hereinafter) may be used to purify the exhaust gas of the internal combustion engine, in which the EHC may be heated by electric power from the battery. In some hybrid vehicles, the EHC may be heated by electric power from the battery when the internal combustion engine has not yet been started (e.g., during an EV travel period in which the hybrid vehicle may be propelled solely by the motor-generator). The EHC may be preheated to an activating temperature prior to the starting up of the internal combustion engine. As a result, upon start-up, the purification rate of the exhaust gas from the internal combustion engine may be improved.

However, in the above-described technique, the electric power required for the propulsion of the hybrid vehicle while heating the EHC via electric power (during the "e-power" heating time of the catalyst, hereinafter) is not taken into account. That is, until the completion of the warm-up of the EHC, the internal combustion engine will not be started. Therefore, during the e-power heating of the EHC, a shortage of the electric power required for the travel of the hybrid vehicle may be experienced.

Therefore, as disclosed in a patent document 1 (i.e., Japanese Patent Laid-Open No. 2011-105133), in case A, if, during the e-power heating time of the EHC while the internal combustion engine is stopped (e.g., while the vehicle is traveling solely on electric power such as during an EV travel period), the driving power Pr required for the travel of the vehicle is equal to or less than the difference between a battery output restriction Wout (i.e., a threshold/maximum amount of electric power supplied by the battery) and a basic e-power supply Phtmp (i.e., a basic amount of electric power supply for the EHC), in other words (Wout−Phtmp), the electric power supply for the EHC is controlled and set to a value equal to the basic e-power supply Phtmp. In case B, if, during the same e-power heating time of the EHC during the EV travel period, the required driving power Pr is (a) greater than the difference between the battery output restriction Wout and the basic e-power supply Phtmp and (b) equal to or smaller than the battery output restriction Wout, the electric power supply for the EHC is controlled and set to a value equal to the difference between the battery output restriction Wout and the required driving power Pr (i.e., Wout−Pr).

However, in the technique disclosed in the patent document 1, while the e-power heating of the EHC is controlled, the electric power consumption due to the starting up of the internal combustion engine and/or the electric power consumption due to supplemental devices such as an air-conditioner, is not considered. Therefore, in the technique of patent document 1, such problems may occur during the e-power heating of the EHC. That is, (i) when a start request for the starting up of the internal combustion engine is generated during the e-power heating of the EHC, the internal combustion engine may fail to start due to a lack of electric power required to start the engine. Or, (ii) even when the starting up of the internal combustion engine is normally performed, the drivability of the vehicle may be deteriorated due to a decreased amount of the electric power available for the travel of the vehicle, caused by the large consumption of electric power used for the starting up of the internal combustion engine. Or, (iii) a restriction value (e.g., the maximum value) of the electric power output from the battery may be exceeded, thereby deteriorating the battery.

SUMMARY

It is an object of the present disclosure to provide a hybrid vehicle control apparatus for preventing electric power issues caused when an EHC is heated by using electric power.

In an aspect of the present disclosure, a hybrid vehicle control apparatus for a hybrid vehicle capable of EV travel generated by a motor-generator with an internal combustion engine in a stopped state is disclosed. The control apparatus includes a battery connected to the motor-generator, wherein the battery provides electric power to the motor-generator and receives electric power from the motor-generator, an EHC heatable by electric power from the battery for purifying an exhaust gas of the internal combustion engine, a maximum value calculation unit for calculating a maximum value of a supply of electric power for the EHC, when the internal combustion engine is in the stopped state, that is provided to the EHC based on (i) at least one of a start-up electric power required for starting up the engine or an operation electric power required for operating a supplemental device, (ii) an electric power output limit value of the battery, and (iii) an electric power required for a travel of the hybrid vehicle, and a power supply controller for controlling the supply of electric power for the EHC based on the maximum value of the supply of electric power for the EHC.

In the above-described configuration, the maximum value of the supply of electric power for the EHC may be calculated and set based on (i) at least one of the start-up electric power required for starting up the engine or the operation electric power required for operating the supplemental device, (ii) the electric power output limit value of the battery, and (iii) the electric power required for the travel of the hybrid vehicle.

Therefore, the maximum value of the supply of electric power for heating the EHC is set to a budgeted value that may afford or account for (i.e., reserves a sufficient amount of electric power) the start-up electric power required for the starting up of the engine, the operation electric power required for operating the supplemental device, and the electric power required for the travel of the vehicle, without allowing the output electric power of the battery to exceed the electric power output limit value of the battery (i.e., without allowing the output electric power to exceed a limit value range). That is, by controlling the supply of electric power required for the heating of the EHC based on such the maximum value of the supply of electric power for heating the EHC, the e-power heating of the EHC is simultaneously controlled to ensure that sufficient electric power reserves remain for the start-up electric power required for starting up of the engine, the operation electric power required for operating the supplemental device, and the electric power required for the travel of the vehicle, while maintaining the electric power output limit value of the battery to a value within the above-described value range.

In such manner, even when the start-up request for the starting up of the internal combustion engine is generated during the e-power heating of the EHC, the starting up of the internal combustion engine is normally performed by reserving a required share of the electric power for the engine start-up, as well as (i) preventing the deterioration of the drivability due to the sharp decrease of the electric power available for vehicle travel and (ii) preventing the deterioration of the battery.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Embodiments of the present disclosure for realizing a drive system of a hybrid vehicle are described in the following.

(First Embodiment)

Figure 1:
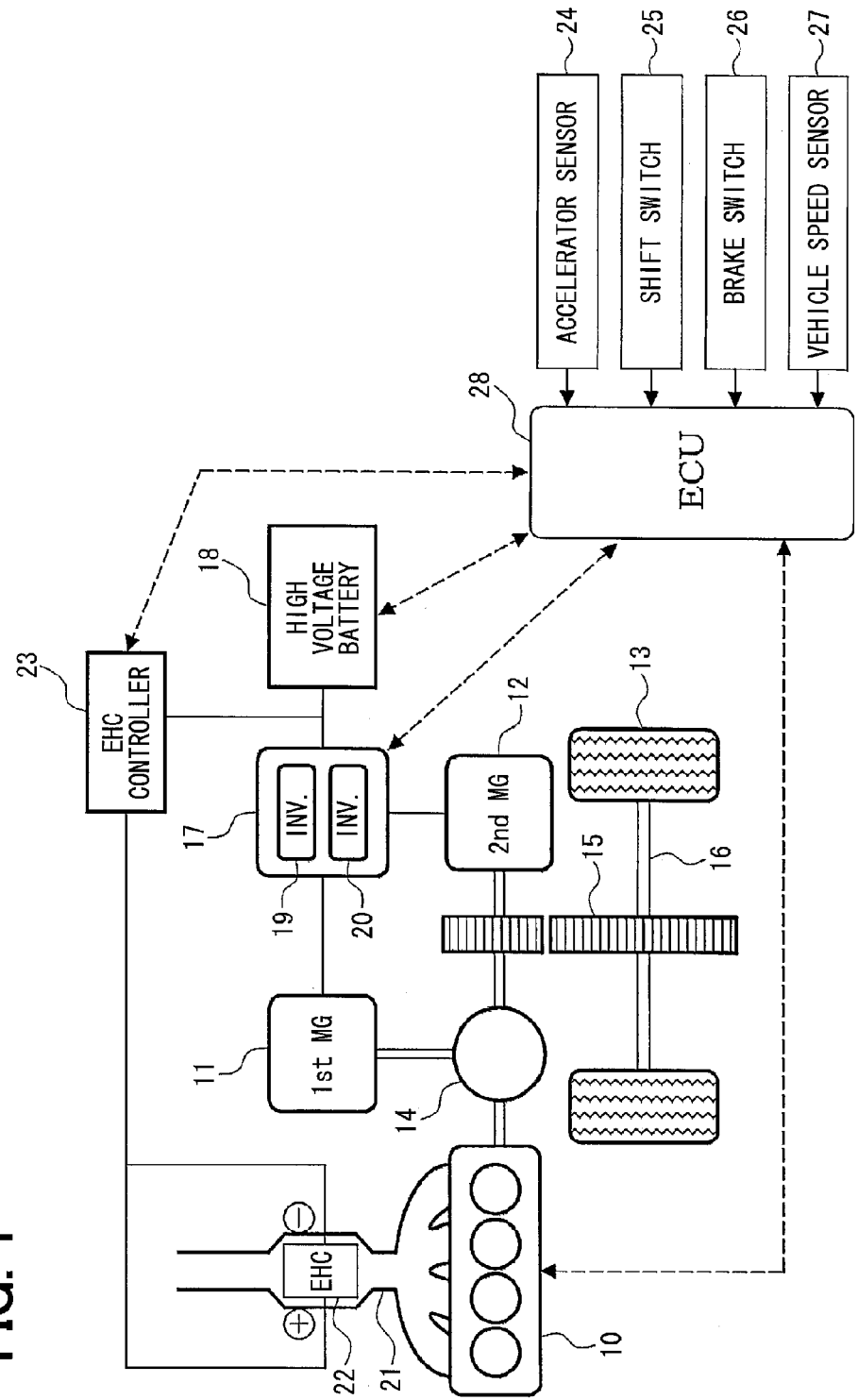
FIG. 1 is a block diagram of a configuration of a drive system of a hybrid vehicle in a first embodiment of the present disclosure.
Figure 2:
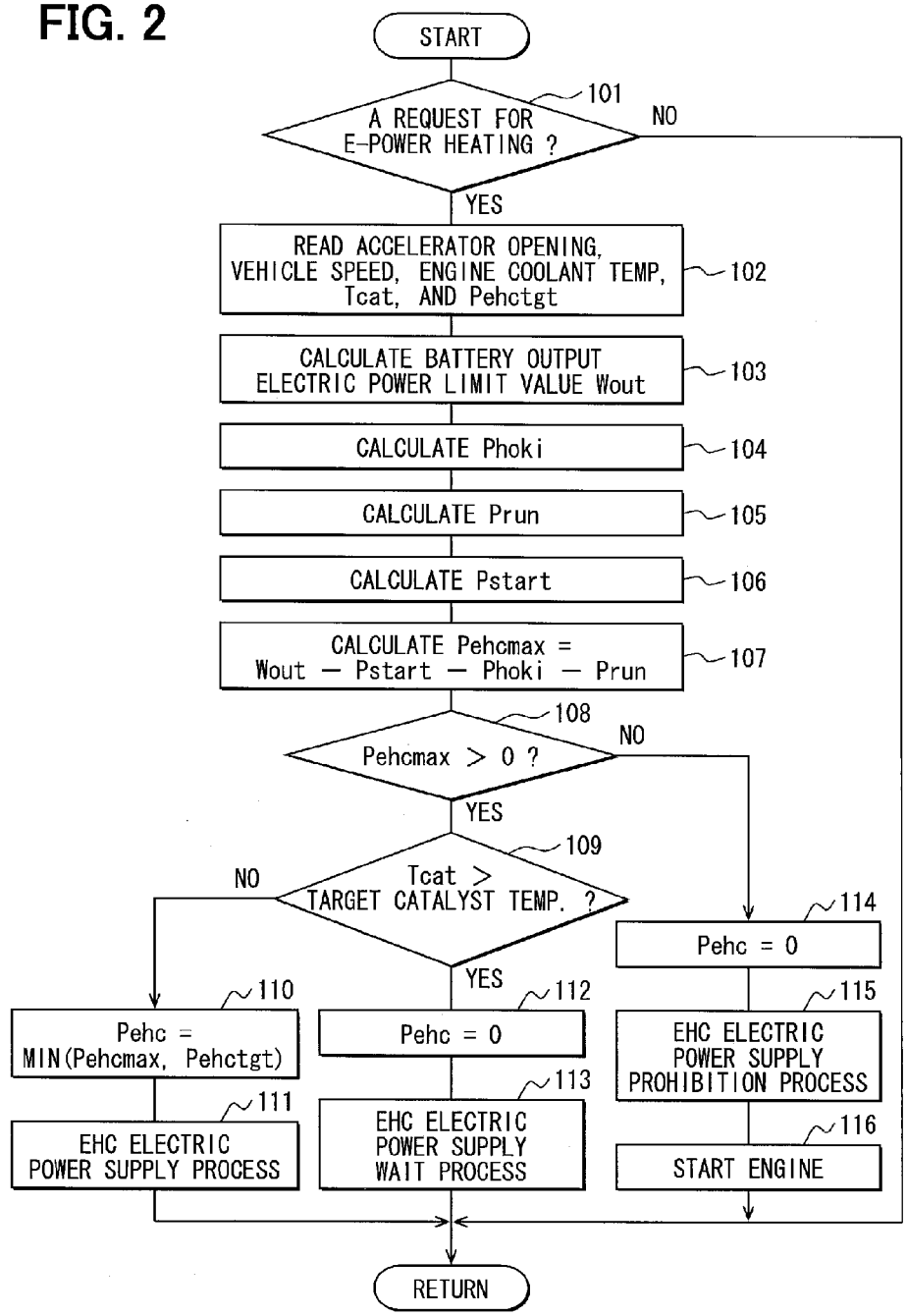
FIG. 2 is a flowchart of an EHC electric power supply control routine in the first embodiment of the present disclosure.
Figure 3:
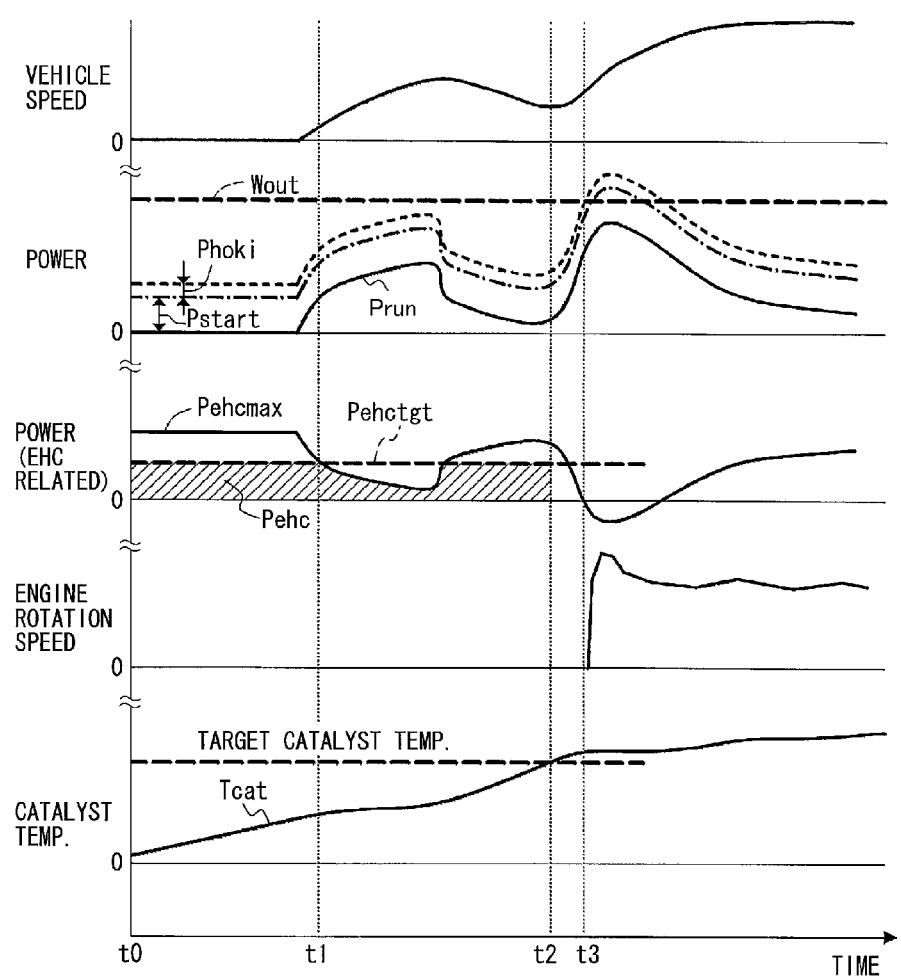
FIG. 3 is a time chart of an example of the EHC electric power supply control in the first embodiment of the present disclosure.

The first embodiment of the present disclosure is described based on FIG. 1 to FIG. 3.

A block diagram of a hybrid vehicle drive system is illustrated in FIG. 1. The hybrid vehicle may have an engine 10 which may be an internal combustion engine, a first motor-generator 11 (i.e., a first MG 11, hereinafter), a second motor-generator 12 (i.e., a second MG 12, hereinafter), and wheels 13 powered by the engine 10 and the second MG 12. A crankshaft of the engine 10, a rotation shaft of the first MG 11, and a rotation shaft of the second MG 12 may be connected by a power split mechanism 14 (e.g., a planetary gear mechanism). The shaft of the second MG 12 may be connected to an axle 16 through a reduction gear mechanism 15.

The first MG 11 and the second MG 12 may be connected to a high voltage battery 18 through a power controller 17. The power controller 17 may have a first inverter 19 for driving the first MG 11 and a second inverter 20 for driving the second MG 12. The MGs 11, 12 may be connected together with other devices. Therefore, each of the MGs 11, 12 exchanges (i.e., sends and receives) electric power to and from the high voltage battery 18 through the respective inverters 19, 20.

An EHC 22 may be disposed in an exhaust gas pipe 21 of the engine 10 as a catalyst for purifying an exhaust gas. The EHC 22 may be heated by receiving electric power. The EHC 22 may have a base member (i.e., a heater) inside the EHC 22. The base member may be made of a conductive resistive material (not illustrated) which serves as a heater for heating the catalyst when the base member receives a supply of electric power from the high voltage battery 18. The supply of electric power for the EHC 22 (i.e., the supply of electric power from the high voltage battery 18 to the EHC 22) may be controlled by a switch circuit (not illustrated) in an EHC controller 23. The EHC controller 23 may have a relay (not illustrated) to connect the EHC 22 to the high voltage battery 18.

Output signals from various sensors such as an accelerator sensor 24 for detecting an opening of an accelerator (i.e., an operation amount of an accelerator pedal), a shift switch 25 for detecting an operation position of a shift lever, a brake switch 26 for detecting a brake operation (or a brake sensor for detecting a braking operation amount), a vehicle speed sensor 27 for detecting a vehicle speed, and the like, are input into an ECU 28. The ECU 28 may be implemented as a microcomputer together with other parts, for controlling the MGs 11, 12 through the control of the inverters 19, 20 and the control of the engine 10, according to the drive state of the vehicle. Further, the ECU 28 controls the EHC controller 23 and controls the supply of electric power for the EHC 22.

Further, the ECU 28 may be provided as a single control unit or as a combination of multiple control units, such as a combination of a hybrid ECU for providing a total control for the hybrid vehicle, an engine ECU for controlling the engine 10, an MG-ECU for controlling the MGs 11, 12 through the control of the inverters 19, 20, and the like. The hybrid ECU may exchange data signals and control signals with the engine ECU or the MG-ECU for allowing the engine ECU to control the engine 10 and the MG-ECU to control MGs 11, 12. In such a case, one of the engine ECU and/or the MG-ECU may be configured to control the EHC controller 23 for controlling the supply of electric power for the EHC 22. Alternatively, a dedicated ECU may be provided for controlling the EHC controller 23 in order to control the supply of electric power for the EHC 22.

When the vehicle starts to travel or when the load on the vehicle is low (e.g., when the engine 10 has low fuel efficiency), the ECU 28 may maintain the engine 10 in a stopped state to allow electric vehicle (EV) travel of the vehicle. The wheels 13 may be driven by the second MG 12 and the second MG 12 may be powered by the electric power of the high voltage battery 18.

When the engine 10 is started, the first MG 11 may be driven by the electric power of the high voltage battery 18. The power of the first MG 11 may be transmitted to the crankshaft of the engine 10 through the power split mechanism 14, which may enable a cranking of the engine 10 (i.e., it drives and rotates the crankshaft of the engine 10) for the start up of the engine 10.

During normal vehicle travel, the power of the engine 10 may be divided by the power split mechanism 14. The power split mechanism 14 may drive the axle 16 to rotate the wheels 13. The power split mechanism 14 may also drive the first MG 11 to generate electric power. The electric power generated by the first MG 11 may then be used by the second MG 12 to drive the axle 16 and the wheels 13. Further, during hard acceleration of the vehicle, electric power from the high voltage battery 18 may be provided to the second MG 12, in addition to the electric power generated by the first MG 11, to increase the drive power of the second MG 12.

Under vehicle deceleration, power from the wheels 13 may be used to drive the second MG 12. The second MG 12 may serves as an electric power generator for converting kinetic energy of the vehicle to electric power. The converted electric power may be stored (i.e., charged) in the high voltage battery 18, which may result in a speed reduction (i.e., regenerative braking) of the vehicle.

Further, in the present embodiment, when the ECU 28 executes an EHC electric power supply routine in FIG. 2, which will be described later, the following values may be calculated when a warm-up request for warming up the EHC 22 is generated during a stop time of the engine 10 (i.e., during the EV travel time or during the stop of the vehicle). That is, the calculated values may be a battery output electric power limit value Wout (i.e., an output electric power restriction value of the high voltage battery 18), an engine start electric power Pstart (i.e., an electric power that is required for a start up of the engine 10), a supplemental device consumed electric power Phoki (i.e., an electric power that is required for the operation of various supplemental devices, such as an air-conditioner, a headlight, and the like), and an electric power for travel Prun (i.e., an electric power required for a travel of the vehicle). An EHC electric power supply limit value Pehcmax (i.e., a maximum value of a supply of an electric power to be supplied for the EHC 22) may be calculated by deducting the engine start electric power Pstart, the supplemental device consumed electric power Phoki, and the electric power for travel Prun from the battery output electric power limit value Wout.

Pehcmax=Wout−Pstart−Phoki−Prun

In such manner, the EHC electric power supply limit value Pehcmax may be set to a sufficient value to provide electric power for the engine start electric power Pstart, the supplemental device consumed electric power Phoki, and the electric power for travel Prun, without allowing the output electric power of the high voltage battery 18 to exceed the battery output electric power limit value Wout.

Further, by controlling the supply of electric power to the EHC 22 based on the EHC electric power supply limit value Pehcmax, the EHC 22 may be electrically heated while simultaneously affording or accounting for the engine start electric power Pstart, the supplemental device consumed electric power Phoki, and the electric power for travel Prun. Additionally, controlling the supply of electric power for the EHC 22 based on the EHC electric power supply limit value Pehcmax may keep the output electric power of the high voltage battery 18 within a limit value range (i.e., within a value range that is bound by the battery output electric power limit value Wout of the high voltage battery 18).

In the following, the EHC electric power supply control routine (i.e., FIG. 2) that is executed by the ECU 28 in the present embodiment is described.

The EHC electric power supply control routine shown in FIG. 2 may be repeatedly executed at predetermined intervals during a power supply turn ON time of the ECU 28. After the start up of the routine, the routine may determine in step 101 whether an electric power supply request for heating the EHC 22 is generated, based on, for example, whether the warm-up request for the warming up of the EHC 22 is generated when the engine is stopped (i.e., during the EV travel time or during the stop of the vehicle).

If determined in step 101 that the electric power supply request for heating the EHC 22 is not generated, the routine may be concluded without performing step 102 and subsequent steps.

On the other hand, if determined in step 101 that the electric power supply request for heating the EHC 22 is generated, the power supply control of the EHC 22 may be performed in step 102 and in the subsequent steps in the following manner.

At step 102, the routine may read an accelerator opening, a vehicle speed, an engine coolant temperature (i.e., cooling water temperature of the engine 10), a catalyst temperature Tcat (i.e., temperature of the EHC 22), an EHC electric power supply target value Pehctgt (i.e., a target value of the supply of electric power for the EHC 22).

For example, the catalyst temperature Tcat may be calculated (i.e., estimated) by using an equation or a map based on a resistance value of the base member (i.e., a heater) of the EHC 22. Alternatively, the catalyst temperature Tcat may be directly detected by using a temperature sensor disposed in the EHC 22. Further, for example, the EHC electric power supply target value Pehctgt may be calculated by using an equation or a map based on the engine coolant temperature, the catalyst temperature Tcat, or the like. Further, the EHC electric power supply target value Pehctgt may be a predetermined fixed value.

At step 103, the battery output electric power limit value Wout (i.e., an output electric power restriction value of the high voltage battery 18) may be calculated by using an equation or a map based on a state of the high voltage battery 18 (e.g., a battery electric current, a battery voltage, a battery state of charge (SOC), battery temperature, or the like).

At step 104, the supplemental device consumed electric power Phoki (i.e., an electric power that is required for the operation of various supplemental devices, such as an air-conditioner, a headlight, and the like) may be calculated by deducting the electric power for travel Prun (e.g., a set value in a previous execution cycle of the routine) and a supply of electric power for the EHC 22 (i.e., an electric power supply Pehc, such as a set value in a previous execution cycle of the routine) from the output electric power of the high voltage battery 18 (i.e., the battery voltage multiplied by the battery electric current). Alternatively, the supplemental device consumed electric power Phoki may be calculated by summing up the electric powers consumed by various supplemental devices, such as the air-conditioner, the headlight, and the like.

At step 105, the electric power for travel Prun (i.e., an electric power required for a travel of the vehicle) may be calculated by using an equation, a map, or the like, based on at least the accelerator opening, the vehicle speed, and the like. At step 106, the engine start electric power Pstart (i.e., an electric power that is required for a start up of the engine 10) may be calculated by using an equation, a map, or the like, based at least on the engine coolant temperature, the vehicle speed, and the like.

At step 107, the EHC electric power supply limit value Pehcmax (i.e., a maximum value of a supply of an electric power to be supplied for the EHC 22) may be calculated by deducting the engine start electric power Pstart, the supplemental device consumed electric power Phoki, and the electric power for travel Prun from the battery output electric power limit value Wout.

Pehcmax=Wout−Pstart−Phoki−Prun

Steps 103 to 107 are referred to as a maximum value calculation unit in the claims.

At step 108, the routine may determine whether the EHC electric power supply limit value Pehcmax is greater than 0. If the EHC electric power supply limit value Pehcmax is greater than 0, the routine proceeds to step 109, and may determine whether the catalyst temperature Tcat is higher than a target catalyst temperature (e.g., an activating temperature of the EHC 22).

At step 109, if the catalyst temperature Tcat is equal to or less than the target catalyst temperature, the EHC 22 may be heated by supplying the EHC 22 with electric power. At step 110, the electric power supply Pehc for the EHC 22 may be set to the lesser of the EHC electric power supply limit value Pehcmax and the EHC electric power supply target value Pehctgt.

More practically, when the EHC electric power supply limit value Pehcmax is equal to or greater than the EHC electric power supply target value Pehctgt, the electric power supply Pehc for the EHC 22 may be set to the EHC electric power supply target value Pehctgt.

$$Pehc=Pehctgt$$

On the other hand, when the EHC electric power supply limit value Pehcmax is less than the EHC electric power supply target value Pehctgt, the electric power supply Pehc for the EHC 22 may be set to the EHC electric power supply target value Pehctgt.

$$Pehc=Pehcmax$$

At step 111, the routine performs an EHC electric power supply process that drives the switch circuit in the EHC controller 23 to establish the electric power supply Pehc at a set value, for supplying the electric power for the EHC 22.

On the other hand, if determined that the catalyst temperature Tcat is higher than the target catalyst temperature in step 109, electric power may not be supplied to the EHC 22 and the routine proceeds to step 112, for resetting the electric power supply Pehc for the EHC 22 to a value of 0. At step 113, the routine may perform an EHC electric power supply wait process, in which the electric power supply for the EHC 22 may be stopped by stopping the drive of the switch circuit in the EHC controller 23, while maintaining the relay in the EHC controller 23 turned ON such that the EHC controller 23 and the high voltage battery 18 may remain in a connected state in preparation for the decrease of the catalyst temperature Tcat.

In contrast, if determined in step 108 that the EHC electric power supply limit value Pehcmax is equal to or less than 0, sufficient power reserves may not be available (i.e., a sufficient electric power) for all of the required electric powers (i.e., the engine start electric power Pstart, the supplemental device consumed electric power Phoki, and the electric power for travel Prun) in addition to supplying the required electric power to the EHC 22 for heating while maintaining the output electric power of the high voltage battery 18 within a limit value range. The routine may then proceeds to step 114 where the electric power supply Pehc for the EHC 22 may be reset to a value of 0.

At step 115, the routine may perform an EHC electric power supply prohibition process, by turning OFF the relay in the EHC controller 23 and breaking the circuit between the EHC controller 23 and the high voltage battery 18, in order to stop the supply of electric power to the EHC 22. At step 116, the first MG 11 may be powered by the electric power of the high voltage battery 18, which enables a cranking of the engine 10 by using the power of the first MG 11 for the starting up of the engine 10.

Steps 108 to 116 are referred to as a power supply controller in the claims.

A practical example of the EHC electric power supply control in the above-described first embodiment is now illustrated with reference to a time chart in FIG. 3.

At a time t0 when an electric power heating request of the EHC 22 is generated, the EHC electric power supply limit value Pehcmax may be calculated by deducting the engine start electric power Pstart, the supplemental device consumed electric power Phoki and the electric power for travel Prun from the battery output electric power limit value Wout.

$$Pehcmax=Wout-Pstart-Phoki-Prun$$

When the EHC electric power supply limit value Pehcmax is greater than 0 and the catalyst temperature Tcat is equal to or less than the target catalyst temperature, the electric power supply Pehc for the EHC 22 may be set to the EHC electric power supply target value Pehctgt, which is the lesser value between the EHC electric power supply limit value Pehcmax and the EHC electric power supply target value Pehctgt (i.e., Pehc=Pehctgt). Further, the electric power may be supplied to the EHC 22 for heating the EHC 22 by driving the switch circuit in the EHC controller 23 so that the electric power supply for the EHC 22 is controlled to have the electric power supply Pehc, which is performed as an EHC electric power supply process.

Then, at a time t1 when the EHC electric power supply limit value Pehcmax decreases due to an increase of the electric power for travel Prun resulting from the start of the EV travel, which decreases the EHC electric power supply limit value Pehcmax to a value below the EHC electric power supply target value Pehctgt, the electric power supply Pehc for the EHC 22 may be set to the EHC electric power supply limit value Pehcmax, which is the lesser value between the EHC electric power supply limit value Pehcmax and the EHC electric power supply target value Pehctgt (i.e., Pehc=Pehcmax), the EHC 22 may be heated by supplying electric power to the EHC 22 by driving the switch circuit in the EHC controller 23. As a result, the electric power supply for the EHC 22 is controlled to have the electric power supply Pehc, which is performed as an EHC electric power supply process.

Then, at a time t2 when the catalyst temperature Tcat rises to a value greater than the target catalyst temperature due to the electric power heating of the EHC 22, the electric power supply Pehc for the EHC 22 is reset to 0 and the EHC electric power supply wait process may be performed, in which the electric power supply for the EHC 22 may be stopped by stopping the drive of the switch circuit in the EHC controller 23, while maintaining the relay in the EHC controller 23 turned ON to maintain the circuit between the EHC controller 23 and the high voltage battery 18 in a connected state.

Then, at a time t3 when the EHC electric power supply limit value Pehcmax falls to a value equal to or less than 0, while performing the EHC electric power supply prohibition process, in which, by turning OFF the relay in the EHC controller 23 to break the circuit between the EHC controller 23 and the high voltage battery 18 which stops the electric power supply for the EHC 22, the first MG 11 may be driven with the electric power of the high voltage battery 18, and a cranking of the engine 10 may be enabled by using the power of the first MG 11 to start up of the engine 10.

In the first embodiment described above, if a warm-up request for the warming up of the EHC 22 is generated during a stop time of the engine 10 (i.e., during the EV travel time or during the stop of the vehicle), the EHC electric power supply limit value Pehcmax may be calculated by deducting the engine start electric power Pstart, the supplemental device consumed electric power Phoki, and the electric power for travel Prun from the battery output electric power limit value Wout. Therefore, the EHC electric power supply limit value Pehcmax may be set to a sufficient value in order to provide electric power for the engine start electric power Pstart, the supplemental device consumed electric power Phoki, and the electric power for travel Prun, without allowing the output electric power of the high voltage battery 18 to exceed the battery output electric power limit value Wout.

Further, since the system may be configured to control the supply of electric power for the EHC 22 based on the EHC electric power supply limit value Pehcmax, the EHC 22 may be electrically heated, under control of the supply of electric power for the EHC 22, for simultaneously affording or accounting for the engine start electric power Pstart, the supplemental device consumed electric power Phoki, and the electric power for travel Prun, while maintaining the output electric power of the high voltage battery 18 within the limit value range (i.e., within a value range that is bound by the battery output electric power limit value Wout of the high voltage battery 18).

Therefore, even if a start request for starting up the internal combustion engine 10 is generated during the e-power heating of the EHC 22, the system may provide the engine start electric power Pstart for properly starting up the engine 10. Further, the system may provide the electric power for travel Prun during the e-power heating of the EHC 22, thereby preventing the deterioration of the drivability of the vehicle. Further, the output electric power of the high voltage battery 18 may be kept within the limit value range during the e-power heating of the EHC 22, thereby preventing the deterioration of the battery.

Further, in the first embodiment, if determined that the EHC electric power supply limit value Pehcmax is equal to or less than 0, the system may maintain the output electric power of the high voltage battery 18 within the limit value range, may preserve the required electric powers in addition to supplying the required electric power for the EHC 22 for heating, and may stop electric power supply to the EHC 22. Therefore, the warming up of the EHC 22 may be performed by utilizing heat from the exhaust gas of the engine 10 such that the power consumption of the high voltage battery 18 is reduced.

Further, when the EHC electric power supply limit value Pehcmax is greater than 0 and the catalyst temperature Tcat is equal to or less than the target catalyst temperature, the electric power supply Pehc for the EHC 22 may be set to the lesser of the EHC electric power supply limit value Pehcmax and the EHC electric power supply target value Pehctgt. In such configuration, when the EHC electric power supply limit value Pehcmax is equal to or greater than the EHC electric power supply target value Pehctgt, the electric power supply Pehc for the EHC 22 is set to the EHC electric power supply target value Pehctgt such that the EHC 22 may be efficiently heated. On the other hand, when the EHC electric power supply limit value Pehcmax is less than the EHC electric power supply target value Pehctgt, the electric power supply Pehc for the EHC 22 is set to the EHC electric power supply limit value Pehcmax for heating the EHC 22, thereby preventing the electric power supply for the EHC 22 from exceeding the EHC electric power supply limit value Pehcmax.

Further, in the first embodiment, when the catalyst temperature Tcat is higher than the target catalyst temperature, the routine may determine that there may be no need to heat the EHC 22 by supplying electric power to the EHC 22. In such case, the electric power supply to the EHC 22 may be configured to be stopped. Therefore, excessive heating of the EHC 22 may be prevented, thereby saving the power of the high voltage battery 18.

(Second Embodiment)

The second embodiment of the present disclosure is described with reference to FIG. 4 and FIG. 5 in the following. Like parts have like numbers in the first and second embodiments. Therefore, the description of the like parts will not be repeated in the second embodiment. In other words, the following description of the second embodiment is focused on the difference between the first and second embodiments.

In the second embodiment, the electric power supply for the EHC 22 may be stopped when the engine 10 is started. Therefore, the electric power cannot be simultaneously supplied for the start-up of the engine 10 and for the heating of the EHC 22.

Figure 4:
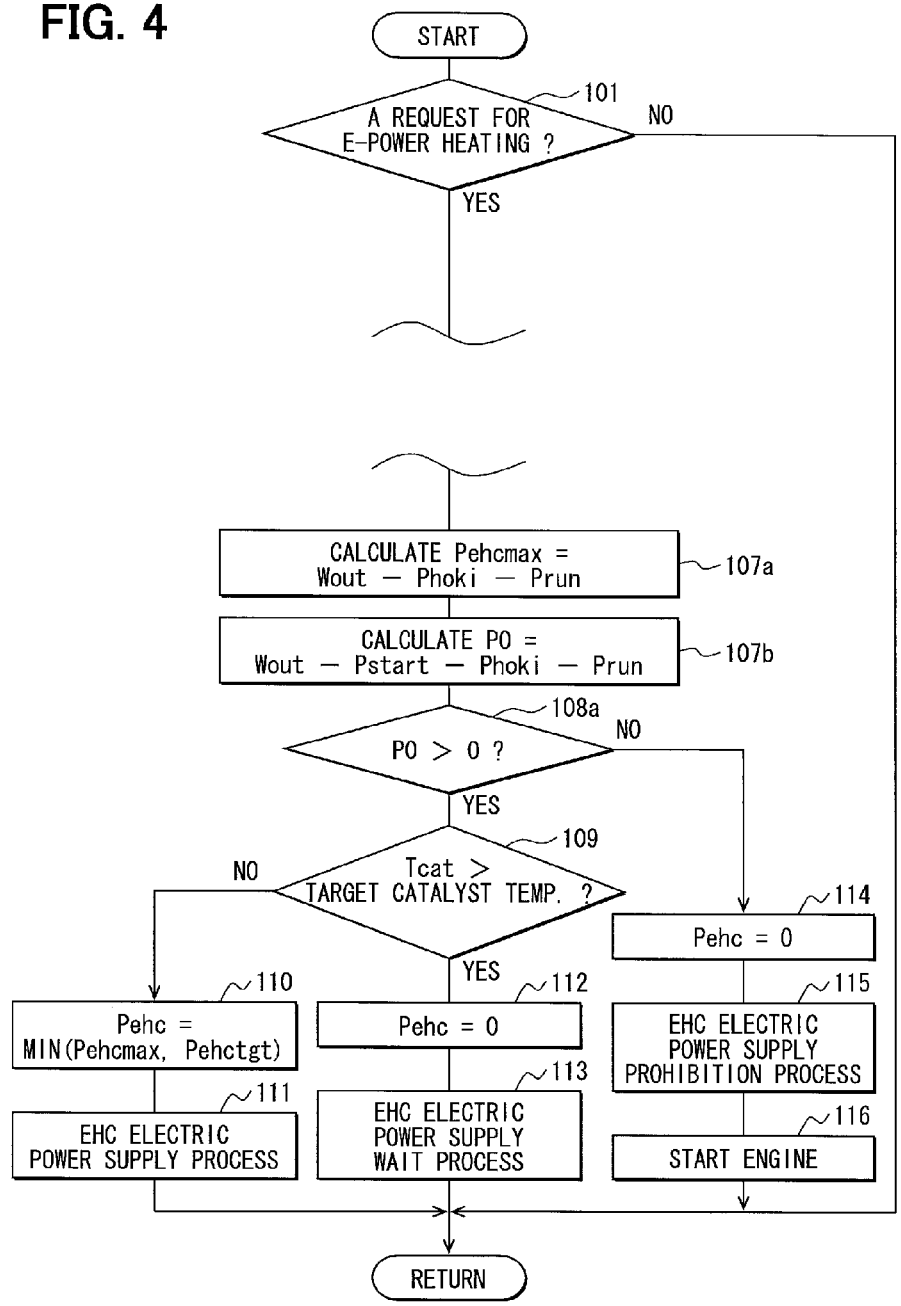
FIG. 4 is a flowchart of an EHC electric power supply control routine in a second embodiment of the present disclosure.
Figure 5:
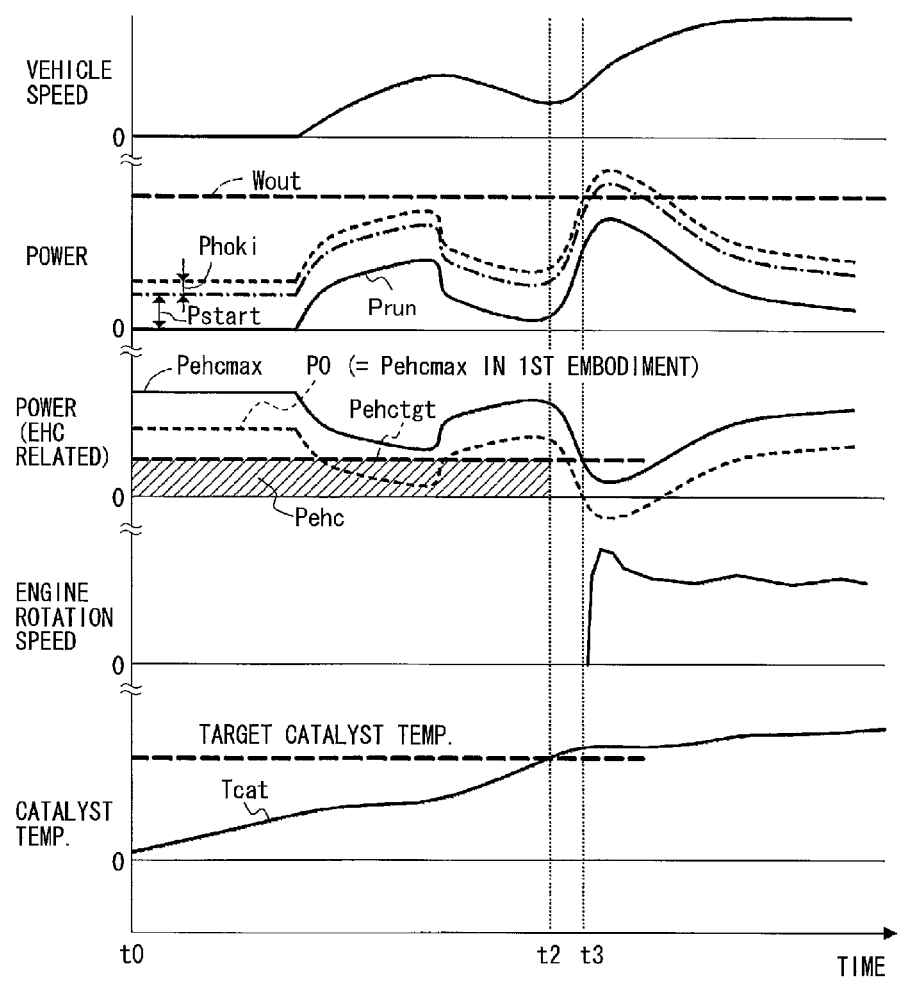
FIG. 5 is a time chart of an example of the EHC electric power supply control in the second embodiment of the present disclosure.

Therefore, in the second embodiment, by controlling the ECU 28 to execute an EHC electric power supply control routine of FIG. 4, the EHC electric power supply limit value Pehcmax may be calculated and set, not by using the engine start electric power Pstart, but by using the battery output electric power limit value Wout, the supplemental device consumed electric power Phoki, and the electric power for travel Prun. That is, by deducting the supplemental device consumed electric power Phoki and the electric power for travel Prun from the battery output electric power limit value Wout, the EHC electric power supply limit value Pehcmax may be calculated and set.

Further, by deducting the engine start electric power Pstart and the supplemental device consumed electric power Phoki and the electric power for travel Prun from the battery output electric power limit value Wout, an EHC electric power supply stop determination value P0 (i.e., a value equivalent to the EHC electric power supply limit value Pehcmax in the first embodiment) may be calculated, and, when the EHC electric power supply stop determination value P0 is equal to or less than 0, the electric power supply for the EHC 22 may be stopped, for the starting up of the engine 10.

In the routine shown in FIG. 4 and to be performed in the second embodiment, the step 107 of the routine in FIG. 2 performed in the first embodiment is replaced with step 107a and step 107b, and the step 108 in the first embodiment is replaced with step 108a, with the other steps kept unchanged from the routine of the first embodiment that is performed in FIG. 2.

In the EHC electric power supply routine in FIG. 4, if determined in step 101 that the electric power supply request for heating the EHC 22 is generated, the routine may read the accelerator opening, the vehicle speed, the engine coolant temperature, the catalyst temperature Tcat, the EHC electric power supply target value Pehctgt and the like, and then may calculate the battery output electric power limit value Wout, the supplemental device consumed electric power Phoki, the electric power for travel Prun, and the engine start electric power Pstart (i.e., step 102 to step 106).

At step 107a, the supplemental device consumed electric power Phoki and the electric power for travel Prun may be deducted from the battery output electric power limit value Wout, to calculate the EHC electric power supply limit value Pehcmax.

Pehcmax=Wout−Phoki−Prun

At step 107b, the engine start electric power Pstart, the supplemental device consumed electric power Phoki, and the electric power for travel Prun may be deducted from the battery output electric power limit value Wout, to calculate the EHC electric power supply stop determination value P0

(i.e., a value equivalent to the EHC electric power supply limit value Pehcmax in the first embodiment).

$$P0 = Wout - Pstart - Phoki - Prun$$

Then, the routine proceeds to step 108*a*, and may determine whether the EHC electric power supply stop determination value P0 is greater than 0. If the value P0 is greater than 0, the routine proceeds to step 109, and may determine whether the catalyst temperature Tcat is higher than the target catalyst temperature.

If the catalyst temperature Tcat is equal to or less than the target catalyst temperature, the routine may set the electric power supply Pehc for the EHC 22 to a value that is the lesser of the EHC electric power supply limit value Pehcmax and the EHC electric power supply target value Pehctgt. The routine may perform the EHC electric power supply process and may drive the switch circuit in the EHC controller 23 to control the electric power supply Pehc to establish a set value, for supplying electric power to the EHC 22 (i.e., step 110 and step 111).

In contrast, if determined that the catalyst temperature Tcat is higher than the target catalyst temperature, the routine may reset the electric power supply Pehc for the EHC 22 to a value of 0, and may perform the EHC electric power supply wait process, in which the electric power supply for the EHC 22 may be stopped while maintaining the relay in the EHC controller 23 turned ON (i.e., step 112 and step 113).

In further contrast, if determined in step 108*a* that the EHC electric power supply stop determination value P0 is equal to or less than 0, while maintaining the output electric power of the high voltage battery 18 within the limit value range, sufficient power reserves may not be available (i.e., a sufficient electric power) for all of the required electric powers (i.e., the engine start electric power Pstart, the supplemental device consumed electric power Phoki, and the electric power for travel Prun) in addition to supplying the required electric power for the EHC 22 for heating. Therefore, the routine resets the electric power supply Pehc for the EHC 22 to a value of 0, and performs the EHC electric power supply prohibition process, in which by turning OFF the relay in the EHC controller 23, the electric power supply for the EHC 22 is stopped for the starting up of the engine 10 (i.e., step 114 to step 116).

In the second embodiment described above, the EHC electric power supply limit value Pehcmax may be calculated and set, not by using the engine start electric power Pstart, but by using the battery output electric power limit value Wout, the supplemental device consumed electric power Phoki, and the electric power for travel Prun. Therefore, the EHC electric power supply limit value Pehcmax may be set to an appropriate value, so that the output electric power of the high voltage battery 18 may be maintained within the limit value range of the battery output electric power limit value Wout, while reserving electric power for the supplemental device consumed electric power Phoki and the electric power for travel Prun. In such case, as shown in FIG. 5, the EHC electric power supply limit value Pehcmax may be increased by an amount of the engine start electric power Pstart relative to the Pehcmax of the first embodiment (i.e., relative to the EHC electric power supply stop determination value P0 in the second embodiment). That is, in other words, the usable range of values for the electric power supply for the EHC 22 may be expanded, which may enable a quicker warm-up of the EHC 22.

Further, in the second embodiment, by deducting the engine start electric power Pstart, the supplemental device consumed electric power Phoki, and the electric power for travel Prun from the battery output electric power limit value Wout, the EHC electric power supply stop determination value P0 (i.e., a value equivalent to the EHC electric power supply limit value Pehcmax in the first embodiment) may be calculated. Then, if the value P0 is equal to or less than 0, while maintaining the output electric power of the high voltage battery 18 within the limit value range, sufficient power reserves may not be available (i.e., a sufficient electric power) for all of the required electric powers in addition to supplying the required electric power for the EHC 22 for heating. As a result, the system may be configured to stop the electric power supply to the EHC 22, for the starting up of the engine 10. Therefore, the warming up of the EHC 22 may be performed by utilizing heat from the exhaust gas of the engine 10, while saving the power of the high voltage battery 18.

Further, the present disclosure is applicable not only to a hybrid vehicle having the configuration shown in FIG. 1, but may be also applicable to a hybrid vehicle having configurations other the one shown in FIG. 1, in which the EV travel of the vehicle is enabled only by the power of a MG while the engine is stopped (e.g., a hybrid vehicle that has a configuration in which an MG is positioned between the engine and the transmission and a clutch is positioned between the engine and the MG in a drive power transmission path from the engine to the tires through the transmission).

What is claimed is:

1. A hybrid vehicle control apparatus for a hybrid vehicle capable of EV travel generated by a motor-generator with an internal combustion engine in a stopped state, the control apparatus comprising:
    a battery connected to the motor-generator, wherein the battery provides electric power to the motor-generator and receives electric power from the motor-generator;
    an electrically-heated catalyst heatable by electric power from the battery for purifying an exhaust gas of the internal combustion engine;
    a maximum value calculation unit for calculating a maximum value of a supply of electric power for the electrically-heated catalyst, when the internal combustion engine is in the stopped state, that is provided to the electrically-heated catalyst as a function of (i) at least one of a start-up electric power required for starting up the engine or an operation electric power required for operating a supplemental device, (ii) an electric power output limit value of the battery, and (iii) an electric power required for a travel of the hybrid vehicle; and
    a power supply controller for controlling the supply of electric power for the electrically-heated catalyst based on the maximum value of the supply of electric power for the electrically-heated catalyst.

2. The hybrid vehicle control apparatus of claim 1, wherein the maximum value calculation unit calculates the maximum value of the supply of electric power for the electrically-heated catalyst by deducting the start-up electric power required for starting up the engine, the operation electric power required for operating the supplemental device, and electric power required for a travel of the hybrid vehicle from the electric power output limit value of the battery.

3. The hybrid vehicle control apparatus of claim 2, wherein the power supply controller stops the supply of electric power for the electrically-heated catalyst for the starting up of the engine, when the maximum value of the supply of electric power for the electrically-heated catalyst is equal to or less than 0.

4. The hybrid vehicle control apparatus of claim 1, wherein the maximum value calculation unit calculates the maximum value of the supply of electric power for the electrically-heated catalyst by deducting the operation electric power required for operating the supplemental device, and the electric power required for a travel of the hybrid vehicle from the electric power output limit value of the battery.

5. The hybrid vehicle control apparatus of claim 4, wherein the maximum value calculation unit calculates an electric power supply stop determination value by deducting the start-up electric power required for starting up the engine, the operation electric power required for operating the supplemental device, and the electric power required for a travel of the hybrid vehicle from the electric power output limit value of the battery, and the power supply controller stops the supply of electric power to the electrically-heated catalyst for the starting up of the engine, when the electric power supply stop determination value is equal to or less than 0.

6. The hybrid vehicle control apparatus of claim 1, wherein the power supply controller sets the supply of electric power for the electrically-heated catalyst to a value that is the lesser of the maximum value of the supply of electric power for the electrically-heated catalyst and an electric power supply target value for controlling the supply of electric power for the electrically-heated catalyst.

7. The hybrid vehicle control apparatus of claim 1, wherein the power supply controller stops the supply of electric power for the electrically-heated catalyst, when a temperature of the electrically-heated catalyst is higher than a target catalyst temperature.

* * * * *